Jan. 27, 1925.
W. A. DOBLE ET AL
1,524,086
CHOCK FOR VEHICLE WHEELS
Filed June 23, 1920  2 Sheets-Sheet 1
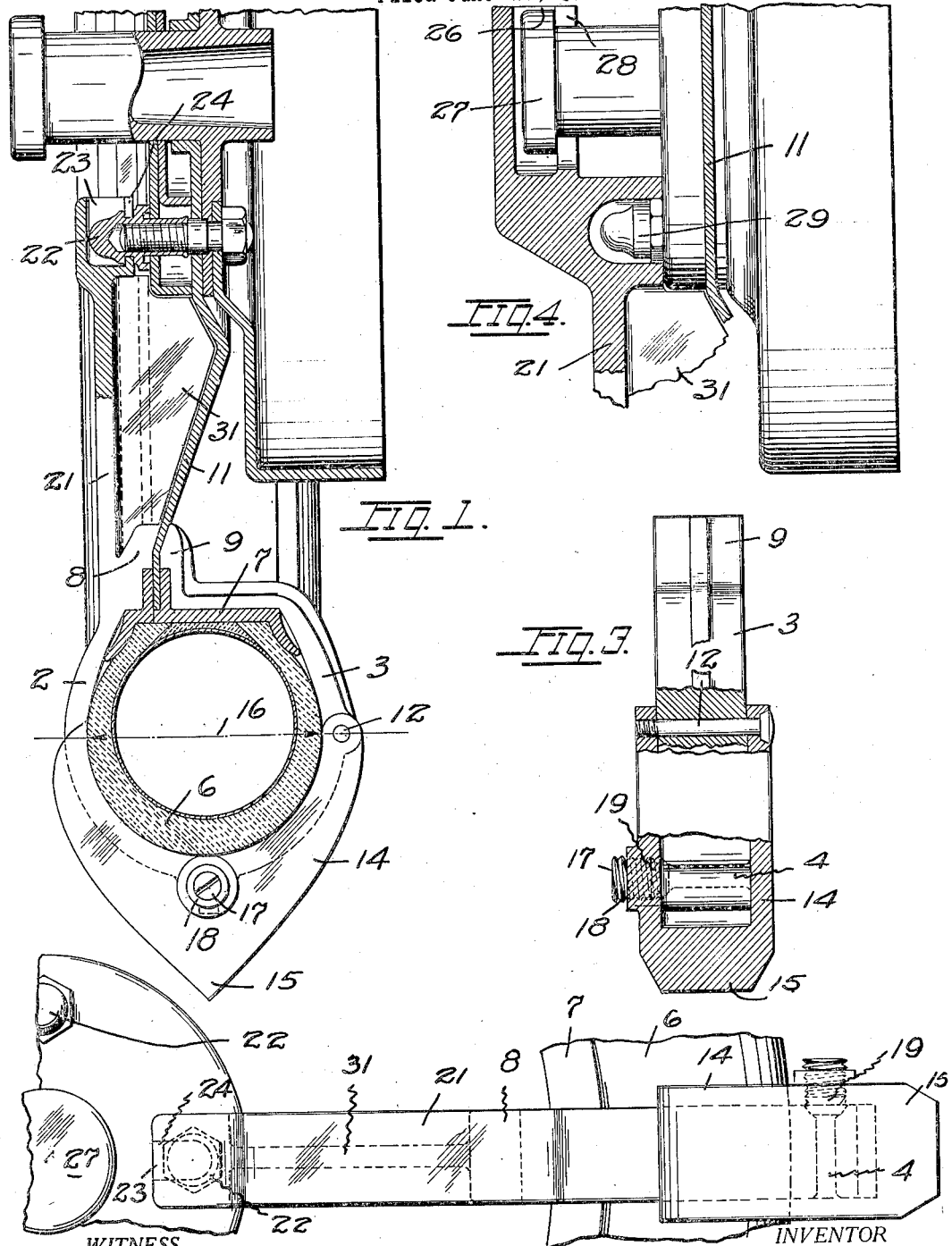
WITNESS
H. A. Sherburne
INVENTOR
William A. Doble.
Charles S. Evans.
BY
White Prost & Evans
their ATTORNEYS

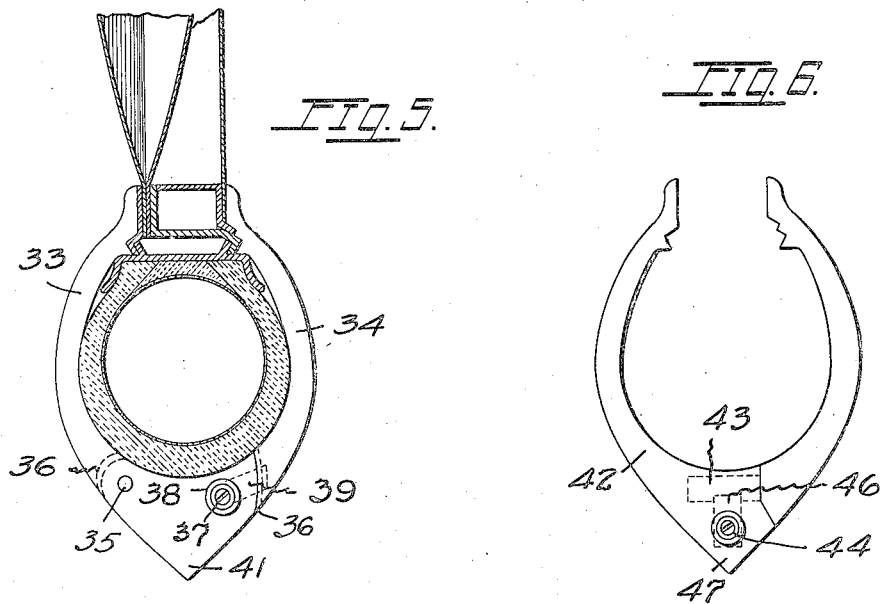
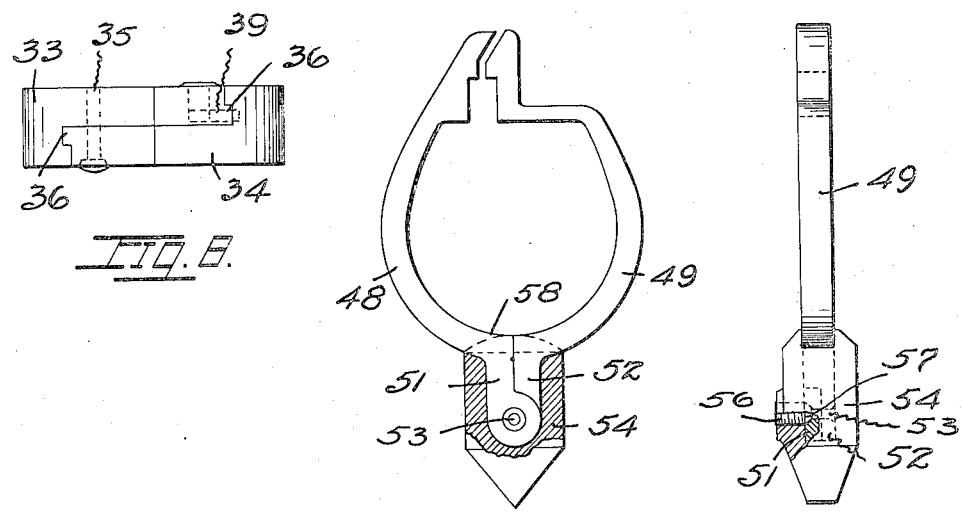

Patented Jan. 27, 1925.

1,524,086

UNITED STATES PATENT OFFICE.

WILLIAM A. DOBLE AND CHARLES S. EVANS, OF SAN FRANCISCO, CALIFORNIA.

CHOCK FOR VEHICLE WHEELS.

Application filed June 23, 1920. Serial No. 391,025.

*To all whom it may concern:*

Be it known that we, WILLIAM A. DOBLE and CHARLES S. EVANS, citizens of the United States, and residents, respectively, of the city and county of San Francisco, and of Berkeley, county of Alameda, State of California, have invented a new and useful Chock for Vehicle Wheels, of which the following is a specification.

Our invention relates to chocks.

A broad object of the invention is to provide a chock especially adapted for use on disk wheels. Lesser objects include the provision of a chock for disk wheels characterized by rugged strength, simplicity of parts and immobility when attached.

The invention possesses other objects and features of advantage, some of which, with the foregoing, will be set forth in the following description of the preferred form of our invention which is illustrated in the drawings accompanying and forming part of the specification. It is to be understood that we do not limit ourselves to the showing made by the said drawings and description, as we may adopt variations of the preferred form within the scope of our invention as set forth in the claims.

Referring to the drawings: Fig. 1 is a plan view of a chock in accordance with our invention. The chock is shown attached to a disk wheel, portions of which and the tire are shown in section. Fig. 2 is a side view of the same, on a somewhat smaller scale. Fig. 3 is a side view of a portion of the chock, parts being shown in section. Fig. 4 is a fragmentary view showing a modified portion of a chock. Figs. 5, 6 and 7 are plan views of modified forms of our invention. Fig. 8 is an end view of the structure shown in Fig. 5. Fig. 9 is a side view of the structure shown in Fig. 7.

A chock locked about the tire and rim of an automobile wheel, has proved to be one of the most effective measures yet devised for preventing theft or unauthorized use of the automobile. With the disk wheels, the chock which completely encircles tire and rim is inapplicable, and it is therefore the purpose of our invention to supply a chock adapted for use with disk wheels, that is, a chock in which provision is made for securing it about the tire and rim without connecting parts within the rim.

In terms of broad inclusion our chock comprises an open yoke formed of connected arms adapted to be placed astride the tire and wheel. The free ends of the arms are engageable with opposite sides of the wheel which lies between such ends, and means are provided for releasably locking the connected ends of the yoke arms to prevent the removal of the chock from the wheel. Preferably that portion of the chock which would strike the ground during rotation of the wheel is pointed so as to leave a characteristic imprint in the roadbed should the automobile be driven with the chock on one of the wheels.

The free ends of the yoke arms may be variously shaped, according to the type of wheel with which the chock is to be used, so that the ends are shaped complementary to the section of rim and disk or disks which they engage, and in the case of certain types of wheels which are readily removed from axle or hub by loosening certain nuts, one of the arms of the chock may be provided with an integral extension enclosing and engaging one of the nuts or the hub cap so that while the chock is in place, the wheel cannot be removed.

Referring first to Fig. 1, a pair of arms 2 and 3 are hinged together at one end by the pivot pin 4 to form an open yoke. The arms are curved so as to enclose the tire 6 and rim 7 of the disk wheel, and the inner or free ends 8 and 9 of the arms are formed complementary to the inner surface of the rim 7 and the disk 11. Pivotal movement of the arms enables them to be straddled about the tire and rim, tightly enclosing them, or to be quickly detached therefrom.

Means are provided for locking the arms together to prevent separation of the arms and detachment of the chock. Pivoted by a pin 12 to the arm 3 is a channel section, arcuate retaining clamp or lock 14 shaped so that it may swing about its pivot pin 12 to snugly embrace within its semi-circular expanse, the chock arms 2 and 3 when positioned on the wheel. Against the middle, the clamp is formed with a point 15 which will leave a characteristic mark in the road if the car is run with the chock in place. When embraced by the clamp, the yoke arms cannot be separated, and the proportions of the parts are such that the opening pressure of the arms upon the clamp is exerted in substantially a straight line 16 through the ends of the clamp, so that such pressure does not resolve itself into a component tending to throw the clamp free of the yoke arms. A key operated lock 17 of known type controls the rotary movement of the threaded barrel 18 terminating in the bolt 19, and provides means for locking the clamp upon the yoke. The upper face of the arm 2 above the pin is countersunk on a slight taper to form a socket in which the tapered end of the bolt 19 is adapted to seat. With the bolt in the socket, the clamp cannot be swung free from the yoke arms, which are therefore securely held about the wheel. Operating the lock to turn the barrel and lift the bolt from the socket permits the clamp to be swung back and the yoke arms to be detached from the wheel.

The pin 4 is headed over as shown to retain it in place and is protected within the clamp when the chock is locked on the wheel. The pin 12 which is exposed to attack is provided with a head recessed into one side of the clamp. The opposite end is threaded into the bossed side of the clamp and upset to fill the conically reamed end of the threaded hole. Any other suitable method may be used to prevent the pin from being driven out.

Since it is an easy matter to remove from the hub the type of disk wheel shown, it is advisable to provide means for preventing the removal of the wheel while the chock is in place. This is accomplished by a bar 21, extending inwardly from and integral with the outer yoke arm 2. The hub flange locking nuts 22 on the wheel, are preferably provided with an annular groove, and the end of the bar is formed with a socket 23 to enable it to be slipped over the nut, and flanges 24 to engage in the annular groove. The nut, when so enclosed, cannot be removed and its engagement with the bar prevents the bar from being wrenched outwardly in an effort to break the clamp 14 or otherwise free the chock from the wheel. If desired, the inner end of the bar may be made as in Fig. 4 in which a socket 26 is provided for the hub cap 27, flanges 28 engaging under the hub cap. A suitable recess is provided for enclosing one of the hub flange nuts 29. Preferably a web 31 on the bar closely follows the form of the disk 11, so that no prying means of any considerable size can be inserted between wheel and bar.

In Fig. 5 we have shown another embodiment of our invention, the arms being formed to suit it for use with another well known type of disk wheel, a portion of which is shown in section.

The chock comprises two arms 33 and 34 pivoted together by the pin 35, which is formed and secured in a manner similar to pin 12 already explained. The two arms are half-lapped together, a groove being formed in each, in which a complementary bead 36 on the other is adapted to seat. The arms thus interlock with each other when closed upon the tire and rim as shown in Fig. 5. A lock 37 of known type is arranged preferably in a bossed portion 38 adjacent the outer end of the arm 33 and controls the bolt 39 adapted to engage the contiguous portion of the arm 34. With the bolt thrown, the interlocked arms are securely locked against pivotal movement. It should be noted that with each arm, the lengths of the respective lever-arms between lock, pivot pin and arm ends are such that destructive stresses are unlikely. Both arms are formed to provide the point 41 of the chock when locked in place on the wheel.

In Fig. 6, we have shown a chock differing from that just explained in that the arm 42 is provided with a socket at its outer or tire end in which a complementary stud 43 is adapted to be seated when the arms are closed upon a wheel. A lock 44 of known type controls the bolt 46 which is adapted to engage the stud to lock the arms together. The end of the arm 42 is formed as a point 47 of the chock.

In Fig. 7 we show a chock in which the arms 48 and 49 are extended in the portions 51 and 52 respectively, at the outer ends of which the arms are joined by the pivot pin 53 similar to pin 4 of Figs. 1 and 3. A separate block 54, provided with a recess in which the portions 51 and 52 of the arms snugly seat when the arms are closed upon a wheel, is provided with a lock 56 and bolt 57 similar to lock 17 and bolt 19 already described in connection with Fig. 1. As shown by the dotted line 58 in Fig. 7, the side of the block is curved up over the joint separating the arms, so that the insertion of a pry is prevented. The opposite end of the block is pointed, as in the other structures already described.

We claim:

1. A chock for a vehicle wheel comprising pivotally connected arms having free ends engageable with opposite sides of said wheel, means for enclosing said arms to prevent pivotal movement thereof, and locking means for securing said enclosing means upon said arms.

2. A chock for a vehicle wheel comprising pivotally connected arms having free ends engageable with opposite sides of said wheel, a recessed block for enclosing said arms adjacent their pivotal connection to prevent separation of said arms, and locking means for securing said recessed block in position.

3. A chock for a vehicle wheel comprising pivotally connected arms having free ends engageable with opposite sides of said wheel, a recessed block pivoted to one of said arms and movable to enclose said arms to prevent separation thereof, and locking means for preventing pivotal movement of said block when closed about said arms.

4. An automobile lock comprising a chock for a wheel of the automobile, and an arm on said chock engageable with a portion of said wheel for preventing removal of the wheel from its mounting.

5. An automobile lock comprising a chock for a wheel of the automobile, and an arm on said chock for rendering inaccessible the fastening means of said wheel.

6. A chock for a vehicle wheel having an arm projecting therefrom for rendering inaccessible a wheel fastening means, and means for engaging the free end of said arm with said wheel structure.

7. The combination with a vehicle wheel and means for fastening the same to its mounting, of a chock having an arm for rendering said fastening means inaccessible, a head on said wheel structure, and means on the free end of said arm for engaging the arm with said head when the chock is in place.

8. A chock for a vehicle wheel comprising arms forming an open yoke, and an extension on one of said arms for rendering inaccessible a wheel fastening means.

9. A chock for a vehicle wheel comprising an open yoke with arms having free ends engageable with opposite sides of said wheel, and means on said yoke for rendering inaccessible a wheel fastening means.

10. A chock for a vehicle wheel comprising an open yoke with arms having free ends engageable with opposite sides of said wheel, and means on said yoke engageable with a wheel fastening means and for rendering said means inaccessible.

11. An automobile lock comprising a chock for a wheel of the automobile and an arm on said chock for preventing the loosening of the fastening means securing said wheel to its mounting.

12. In combination with a wheel of an automobile, of means for engaging and preventing removal of the hub cap of said wheel, said means having an extension projecting outwardly beyond the perimeter of the wheel so as to act as an obstruction to free rotation of said wheel and means for locking said means upon the wheel.

13. An automobile lock comprising a bar, key actuated locking means for securing the bar to a wheel of an automobile so that the bar projects outwardly beyond the perimeter of the wheel, and a cap on the inner end of the bar for reception of the hub cap of said wheel.

14. An automobile lock comprising a bar, key actuated locking means for securing said bar to a wheel of an automobile so that one end of the bar extends outwardly beyond the perimeter of the wheel and the other end is disposed adjacent the hub of said wheel and a hub cap cover on said inner end.

15. An automobile lock comprising a bar, key actuated locking means for securing said bar to a wheel of an automobile so that one end of the bar extends outwardly beyond the perimeter of the wheel and the other end is disposed adjacent the hub of said wheel and a hub cap cover on said inner end, said bar having a cutting die on its extended end.

In testimony whereof, we have hereunto set our hands.

WILLIAM A. DOBLE.
CHARLES S. EVANS.